United States Patent [19]

Timm et al.

[11] Patent Number: 5,089,447

[45] Date of Patent: Feb. 18, 1992

[54] HIGH HARDNESS, WEAR RESISTANT MATERIALS

[75] Inventors: Edward E. Timm; Ann M. McCombs, both of Traverse City, Mich.

[73] Assignee: The Dow Chemical Company, Midland, Mich.

[21] Appl. No.: 594,884

[22] Filed: Oct. 9, 1990

[51] Int. Cl.⁵ .............................................. C04B 35/56
[52] U.S. Cl. ........................................ 501/87; 501/96; 423/440
[58] Field of Search .................... 501/96, 87; 423/440

[56] References Cited

U.S. PATENT DOCUMENTS

| | | | |
|---|---|---|---|
| 3,451,791 | 6/1969 | Meadows | 501/87 |
| 3,488,291 | 1/1970 | Hardy et al. | 501/87 |
| 3,660,050 | 5/1972 | Iler et al. | 75/950 |
| 3,886,254 | 5/1975 | Tanaka et al. | 501/87 |
| 4,066,821 | 1/1978 | Cook et al. | 427/249 |
| 4,124,665 | 11/1978 | Petersen et al. | 501/87 |
| 4,828,584 | 5/1989 | Cutler | 501/87 |
| 4,891,338 | 1/1990 | Gesing et al. | 501/87 |
| 4,945,073 | 7/1990 | Dubensky et al. | 501/93 |

Primary Examiner—William R. Dixon, Jr.
Assistant Examiner—Sue Hollenbeck
Attorney, Agent, or Firm—D. R. Howard

[57] ABSTRACT

A powdered admixture of a metal and its boron, carbon, nitrogen or silicon derivative is, when subjected to densification conditions, partially reacted and converted to a hard, wear resistant material. Such a material, when formed from an admixture of tungsten carbide and tungsten, contains tungsten monocarbide and (di-tungsten) carbide. Other choices of metal and metal derivatives produce at least one compound having a stoichiometry which differs from that of starting metal derivative. Articles formed from this material can be useful as, for example, nozzles in abrasive or nonabrasive waterjet cutting machines and various parts of wire drawing apparatus.

7 Claims, No Drawings

HIGH HARDNESS, WEAR RESISTANT MATERIALS

BACKGROUND OF THE INVENTION

This invention generally concerns a material containing (a) at least one product of an incomplete reaction of a mixture of a metal, its boron, carbon, nitrogen or silicon derivative and, optionally, boron, carbon, nitrogen or silicon and (b) an amount of the metal derivative. This invention particularly concerns a material containing tungsten carbide (WC) and at least one product of an incomplete reaction between tungsten carbide as the metal derivative and tungsten. This invention further concerns wear resistant articles formed from such materials.

SUMMARY OF THE INVENTION

In a first aspect, the present invention is a material having a high degree of hardness or wear resistance and comprising at least one product of an incomplete reaction between AX, A, and, optionally, an amount of X, said incomplete reaction product comprising an amount of unreacted AX and at least one compound AX', each compound AX' having a stoichiometry which differs from that of AX, wherein A is selected from the group consisting of titanium, manganese, zirconium, hafnium, vanadium, niobium, tantalum, iron, chromium, molybdenum and tungsten and X is selected from the group consisting of boron, carbon, silicon and nitrogen. The reaction product may also comprise a residual amount of A if such is not completely consumed in forming the compound(s) AX'. The reaction product, when sufficiently densified, provides the desired hardness and wear resistance.

In a second aspect, the present invention is a method of preparing a material having a high degree of hardness or wear resistance. The method comprises subjecting a powdered admixture of AX and A, and, optionally, an amount of X to conditions of temperature and pressure sufficient to form at least one product of an incomplete reaction among components of the powdered admixture, said product being designated as AX' and having a stoichiometry which differs from that of AX, and produce a substantially fully dense, consolidated material comprising an amount of unreacted AX and the product(s) AX', said product AX' having minimal grain growth when compared to AX, A being a metal selected from the group consisting of titanium, manganese, zirconium, hafnium, vanadium, niobium, tantalum, iron, chromium, molybdenum and tungsten and X being selected from the group consisting of boron, carbon, silicon and nitrogen, the temperature being low enough to substantially preclude degradation of AX, AX' and A. The temperature is beneficially less than about three fourths of the lesser of the melting point of AX, AX' and A. Temperatures in excess of three fourths of the lower melting point are believed to lead to excessive grain growth and drive the reaction toward completely reacting AX. These results are believed to be undesirable. The consolidated product suitably has a Vickers hardness of at least about 1900 kg/mm$^2$ measured using a 1 kg load. The Vickers hardness is beneficially at least about 2200 kg/mm$^2$. The process may further comprise one or more preliminary steps such as forming the powdered admixture of AX and A, and converting the admixture into a shaped greenware article. The process may also comprise one or more finishing steps subsequent to densification.

In a third aspect, the present invention is an improved wear-resistant article formed from high hardness material of the first aspect. Examples of wear-resistant articles include nozzles, e.g., waterjet cutting nozzles or mixing tubes, abrasive blast nozzles, water blast nozzles, spray dry nozzles, paint spray nozzles and the like. Other articles include orifices, e.g., choke valves and flow meter parts; bushings; pump and valve parts; tiles, sleeves, chutes, tubes and other parts used in handling abrasive materials such as coal or mineral slurries; cutting tools, e.g., indexable inserts, end mills, router bits, reamers, drills, saw blades, and knives used, where appropriate, for machining or cutting materials such as metals, plastics, wood products and composites; dies, capstans, rollers, guides, punches, forming tools and the like used for wire drawing, tube drawing, extrusion, molding, textile manufacturing and other operations requiring hardness or wear resistance; powder compacting dies; EDM current contacts and guides; sporting equipment; and precision parts for timepieces, computers, guns, gyroscopes and the like. This listing of articles is solely for purposes of illustration and is not intended to be all-inclusive.

DETAILED DESCRIPTION OF THE INVENTION

The present invention employs a material AX. A is a metal selected from the group consisting of titanium, manganese, zirconium, hafnium, vanadium, niobium, tantalum, iron, chromium, molybdenum and tungsten. X is an element selected from the group consisting of boron, carbon, silicon and nitrogen. A is beneficially tungsten or hafnium, preferably tungsten. X is beneficially carbon, silicon or nitrogen, desirably carbon. As such, tungsten carbide is a preferred, commercially available material. The tungsten carbide has an average grain size which is suitably about ten micrometers or less, beneficially about five micrometers or less, desirably about one micrometer or less and preferably from about 0.4 to about 0.8 micrometer. The grain size is desirably as fine as possible. Such a size is not, however, always commercially available. In that case, commercially available powders may have to be used as is or, if possible, reduced in size by attrition or another suitable process prior to use. Acceptable grain sizes for other materials of the formula AX suitably approximate those for tungsten carbide and are readily determined without undue experimentation.

The present invention also employs an amount of A. A, defined hereinabove, is identical to the metal portion of AX. In other words, A is tungsten when AX is tungsten carbide. The amount is beneficially large enough to promote formation of AX', but small enough to leave at least a portion of the AX unreacted. The amount is suitably from about 1 to about 90 parts by weight per hundred parts of AX. When A is tungsten, a suitable average grain size is about 10 micrometers or less. A desirable average grain size is from about 0.1 to about 1 micrometer. Acceptable grain sizes for other members of the group from which A is selected are beneficially of the same order of magnitude as tungsten.

Addition of one or more auxiliary or binding metals, such as cobalt or some other iron group metal, while permissible provided they do not adversely affect physical properties of resultant compositions, is believed to be unnecessary. The inadvertent addition of trace amounts is largely unavoidable if milling or attritor media used to form powdered mixtures contain an amount of such metal. If present, an iron group metal may allow use of lower densification temperatures, e.g., 1400° C. or below. In the absence of an iron group metal one need only use higher temperatures to approach or attain substantially complete densification.

As used herein, the terms "incomplete reaction", "incomplete reaction product" and "product(s) of an incomplete reaction" all refer to the reaction among components of the powdered admixture wherein at least a portion of AX does not react with A. As a consequence, that portion is admixed with AX' and, optionally, a small amount of the source of A in products in the present invention.

Densification conditions, primarily expressed in terms of temperature and pressure, are selected to minimize grain growth while attaining a desired degree of densification. The conditions include a temperature which is less than about three fourths of the lesser of the melting points of AX, AX' and A, but greater than a temperature at which no appreciable consolidation occurs. The pressure is suitably sufficient to achieve a density of about 85 percent of theoretical density or greater. The density is beneficially more than about 90 percent and preferably about 100 percent of theoretical density.

Another measure of adequate densification is porosity of the densified articles of this invention. The porosity is suitably minimized to attain optimum hardness. As such, the porosity is beneficially less than about 5 volume percent, based upon total article volume. The porosity is desirably less than about 3 volume percent and preferably less than 1 volume percent.

"Theoretical density", as used herein, is a calculated value based upon weight fraction and density of the starting components. "High density", as used herein, refers to a density of at least about 90 percent of theoretical density.

"Substantially fully dense", as used herein means either a density of 99 percent or more of theoretical density or a porosity of less than about 1 volume percent.

When A is tungsten and X is carbon, densification conditions are beneficially sufficient to produce a material having a Vickers hardness, measured using a 1 kg load, of at least about 2200 kg/mm$^2$. The Vickers hardness is desirably more than about 2300 kg/mm$^2$ and preferably more than about 2400 kg/mm$^2$. Lower Vickers hardness values, e.g., about 1900 kg/mm$^2$ or less, are suitable for applications wherein the higher hardness values are not needed or desired. Other choices for A and X provide a variety of acceptable Vickers hardness values.

The starting materials, AX, A and, optionally an amount of X, are beneficially in particulate or powder form before they are converted to an admixture. It is believed that small particles offer more advantages than large particles, at least in terms of hardness, wear and residual unreacted A. Small particles, as a general rule, also require less mixing time than large particles. Based upon factors such as availability, larger particles sizes may have to be used as received or, if necessary, subjected to size reduction operations before use.

The powdered admixture need not be prepared by any particular process. Conventional mixing processes may be used so long as they yield a generally uniform admixture. The processes should also not adversely affect physical properties of the resultant material, e.g., by contamination. An attritor, which uses balls of hard material to promote mixing, provides particularly satisfactory results.

Attritor mixing is beneficially accomplished with the aid of a liquid such as heptane. In order to facilitate greenware formation subsequent to mixing, a binder such as paraffin wax can be added during the final stages of attrition. The attrited mixture is desirably dried before further processing. Particularly satisfactory results are obtained by screening or classifying the attrited and dried mixture to remove unwanted agglomerates and fines.

The process of the present invention may also comprise a second preliminary step wherein the attrited, dried and classified mixture is converted to a preform. Preforms can be prepared using technology known in the powder metals or ceramics industries. See, e.g., U.S. Pat. No. 4,446,100; and *Modern Ceramic Engineering*, Chapter 6, pages 178–215 (1982), the teachings of which are incorporated herein by reference.

A typical procedure for converting a particulate material, which can contain reinforcements, fillers, densification aids, binders, lubricants, dispersants, flocculants, etc., into a preform begins by forming or shaping the powder into a desired configuration using uniaxial pressing, isostatic pressing, slip casting, extrusion, injection molding or any similar technology. The resulting article is then prepared for densification by thermal or chemical debindering, pre-sintering, green machining, reisopressing, and the like. A protective coating can be applied to the resulting article to prevent reaction with the environment. In extreme cases, the article can be "canned", or placed in an impervious container, to permit handling without atmospheric contamination. The resulting article, as prepared for densification, is referred to herein as "greenware".

When A is tungsten and X is carbon, densification is suitably conducted at a temperature of less than about 2000° C. Temperatures in excess of 2000° C., e.g., about 2500° C., offer no appreciable advantages in terms of an increase in density. Such temperatures do, however, provide a significant disadvantage in that they promote grain growth which is believed to adversely affect performance of the densified material in practical considerations like hardness. Temperatures which are too low to achieve adequate densification are unacceptable. It is believed that adequate densification cannot be achieved much below about two-fifths of the melting temperature of the lower melting component, AX, AX' and A. Some combinations of AX, AX' and A may require higher temperature, e.g., on the order of one-half of the melting temperature of the lower melting component. Suitable temperatures are readily determined without undue experimentation.

The greenware is subjected to pressure assisted densification using one of several techniques known to those skilled in the art whereby the greenware is desirably subjected to pressure at elevated temperatures to produce a desired article. These techniques include hot pressing, hot isostatic pressing (HIP'ing) and rapid omnidirectional compaction (ROC). Although any of these techniques may be used with varying degrees of success, particularly suitable results are obtained by the ROC technique which employs mechanically induced pressure, e.g., that generated by using a forging press, as a means of densifying greenware.

A desirable method of converting the greenware into a satisfactory densified article is described in U.S. Pat. No. 4,744,943, the teachings of which are incorporated herein by reference. When such a method is employed, the pressure is suitably applied for a period of time of less than about one hour. The period of time is beneficially less than about thirty minutes, desirably less than about one minute and preferably less than about 30 seconds, e.g., 10–30 seconds. In order to facilitate recovery of resultant densified parts, the greenware is desirably wrapped in graphite foil or some other substantially inert material prior to being placed in a glass pocket fluid die or other densification medium.

U.S. Pat. No. 4,081,272 discloses a glass-encapsulated HIP process. U.S. Pat. No. 3,622,313 discloses a HIP process. The teachings of these patents are incorporated herein by reference. If the glass-encapsulated process is used, a desirable modification includes evacuating the glass capsule containing a part to be densified and eliminating the use of powdered glass. Application of pressure suitably occurs over a period of one hour or less.

The densified article prepared in the manner described hereinabove is a complex, multi-phase, fine-grained composite containing, as principal components, at least one product AX' and an amount of AX. When A is tungsten and X is carbon, the composite will contain tungsten carbide, a known material of fixed stoichiometry, and (di-tungsten) carbide, another known material of fixed stoichiometry. If A is not fully converted to the compound AX', the composite will also contain an amount of A. The amount may vary from as little as a trace amount, e.g., about 0.01 percent by weight or less, to a much larger quantity depending upon a variety of interrelated variables. Such variables include starting material selection, adequacy of mixing, and densification parameters. Finally, if an attritor is used for mixing and the balls contained therein are formed at least partially from a material other than the starting materials, e.g., cobalt, that material may be incorporated into the composite as, for example, part of an additional mixed carbide phase.

The Vickers hardness of an article representative of the present invention, e.g., that produced when A is tungsten and X is carbon, is suitably at least about 2200 kg/mm$^2$ measured using a 1 kg load. The Vickers hardness is beneficially at least about 2300 kg/mm$^2$, and desirably at least about 2400 kg/mm$^2$. As noted hereinabove, lower Vickers hardness values on the order of 1900 kg/mm$^2$ or even lower may be acceptable for some applications.

The article suitably exhibits an abrasion wear resistance of at least about 500 cm$^{-3}$ measured by the ASTM G65-80 method. The abrasion wear resistance is desirably at least about 550 cm$^{-3}$. The article beneficially exhibits an erosion wear rate of no more than about $3 \times 10^{-3}$ mm3/g of abrasive measured at a 30 degree angle measured by the ASTM G76-83 method. The article desirably exhibits an erosion wear rate of no more than about $2 \times 10^{-3}$ mm3/g of abrasive measured at a 90 degree angle measured by the ASTM G76-83 method. Although lower wear rates would clearly be desirable, measurement of such rates with currently available equipment is quite difficult, if not impossible. Hardness and wear resistance values vary with the materials represented by A and X. Wear resistance is proportional to hardness. As such, softer materials may provide an abrasion wear resistance below 500 cm$^{-3}$.

The densified article suitably has a fine-grained structure with an average grain size of less than about ten micrometers. The grain size is beneficially less than about five micrometers and desirably ranges from about 0.1 micrometer to about one micrometer.

SPECIFIC EMBODIMENTS OF THE INVENTION

The following examples and comparative experiments illustrate the present invention and should not be construed, by implication or otherwise, as limiting its scope. All parts and percentages are by weight and all temperatures are in degrees centigrade (°C.) unless otherwise indicated.

EXAMPLE 1

A mixture of 88 percent tungsten carbide powder having an average particle size of 0.8 micrometer, and 12 percent tungsten powder having an average particle size of about 1 micrometer is used as a starting material. The tungsten is added to a heptane slurry of the tungsten carbide in an attritor. The attritor is a Union Process model 01HD research attritor. The starting material is intensely mixed in an attritor containing 3.5 kilograms of tungsten carbide-cobalt balls for 4 hours. About 2–3 percent paraffin wax is added as a binder during the last thirty minutes of attritor mixing. The resultant mixture is dried and screened through a 20 mesh screen.

Greenware parts are made by cold-pressing the screened mixture in steel tooling at 5,000 pounds per square inch (psi) (35 MPa). The cold-pressed parts are then cold isostatically pressed at 30,000 psi (210 MPa). The resultant parts are dewaxed under vacuum at 350° C., reduced under a hydrogen atmosphere at 450° C., and pre-sintered at 1400° C. The pre-sintered parts are then wrapped in graphite foil, commercially available from Union Carbide under the trade designation Grafoil ®, placed into a glass pocket fluid die, and preheated to 1650° C. and held at that temperature for 15 minutes in a nitrogen atmosphere. The die is placed in a die shell previously preheated to a temperature of 1400° C. over a period of 90 minutes to provide a die assembly. The die assembly is then isostatically pressed at 120,000 psi (830 MPa) for 20 seconds. The pressing procedure is described in more detail in U.S. Pat. Nos. 4,744,943; 4,428,906; and 4,656,002, the teachings of which are incorporated herein by reference. The fluid die is cooled in air and the parts are recovered and sand blasted.

Analytical work involves the use of metallography, light microscopy, analytical scanning electron microscopy (ASEM), electron probe analysis (EPA), analytical transmission electron microscopy (ATEM), and x-ray diffraction (XRD). Microstructures are observed under the SEM, ATEM, and light microscopes. Determination of the presence of a reaction phase makes use of XRD. Composition of the reaction phase is determined by EPA and ATEM. Volume fraction of phases is determined by stereology of BSE images, and grain counting in ATEM.

Analysis of the composite indicates that it is a discrete, multi-phase composite including about 70 percent by volume WC, about 30 percent by volume (ditungsten) carbide. The material is substantially granular with no discernible (at 300,000× magnification) binder phase or continuous phase.

Grain size distribution is determined using the intercept method described by Underwood in *Quantitative Stereology*, Addison-Wesley, Reading, MA (1970). The grain sizes typically fall within a range of 0.1 to 1 micrometer. The physical properties of the parts are summarized in Table I.

TABLE I

| Physical Properties of Articles Prepared in Ex. 1 | | |
|---|---|---|
| Property | Measured Value | Method |
| Density | 15.84 (99.0% of Theoretical) g/cm$^3$ | Water immersion ASTM B311-58 |
| Hardness | 2364 kg/mm$^2$ | Vickers-13.6 kg load |
| Hardness | 95.1 | ASTM B-294-76 (Rockwell A) |
| Palmqvist Toughness (W) | 22.7 kg/mm | Palmqvist indentation |
| Wear Rate | 653 1/cm$^3$ | ASTM 065-80ASTM 076-83 |
| A. Abrasion | 0.473 × 10$^{-3}$ mm$^3$/g (30°) | |
| B. Erosion | 0.336 × 10$^{-3}$ mm$^3$/g (90°) | |
| Porosity | A02–A04 | ASTM B-276-79 |

The data presented in Table I show that the composite exhibits outstanding hardness and wear resistance. Similar results are expected with other compositions of the present invention.

EXAMPLE 2

Example 1 is repeated except for increasing the temperature to which the glass pocket die containing the greenware is heated to 1800° C. Physical properties of the resultant parts are shown in Table II

TABLE II

| Physical Property Data - Example 2 | |
|---|---|
| Property | Measured Value |
| Density | 15.88 (99.3% of theoretical) |
| Hardness | 2472 Kg/mm$^2$ |
| Palmqvist toughness | 21.4 Kg/mm |
| Hardness (Rockwell A) | 95.6 |
| Porosity | A04–A06 |

The data shown in Table II demonstrate that an increase in consolidation temperature provides some increase in properties, particularly in terms of hardness and density. The high hardness value is believed to correspond to good wear properties. Similar results are expected with other compositions of the present invention.

EXAMPLE 3

Example 1 is repeated using a mixture containing 24 percent tungsten. Physical properties of the resultant parts are shown in Table III.

TABLE III

| Physical Property Data - Example 3 | |
|---|---|
| Property | Measured Value |
| Density | 16.14 (98.5% of Theoretical) |
| Hardness | 2283 Kg/mm$^2$ |
| Palmqvist toughness | 19.6 Kg/mm |
| Hardness (Rockwell A) | 95.5 |
| Porosity | A02 |

The data displayed in Table III, when coupled with that of Example 1, suggest that excellent physical properties are available over a range of compositions. Similar results are expected with other compositions and process conditions, all of which are disclosed herein.

VICKERS HOT HARDNESS TESTING

The material of Example 1 is subjected to Vickers Hot Hardness testing in accordance with the procedure described by B. North in *Engineering Applications of Brittle Materials*, page 159 (1985), the teachings of which are incorporated herein by reference. Results of the testing, with a one kilogram load and a 15 second indent time at various temperatures, are displayed in Table IV.

TABLE IV

| Hot Hardness | |
|---|---|
| Temperature (°C.) | Vickers Hardness (kg/mm$^2$) |
| 25 | 2641 |
| 100 | 2452 |
| 300 | 2417 |
| 500 | 2088 |
| 700 | 1693 |
| 900 | 1219 |
| 1100 | 766 |
| 1300 | 191 |

The data shown in Table IV indicate the suitability of compositions of the present invention for high temperature applications such as cutting tools for metals. Similar results are obtained with other materials and process conditions, all of which are disclosed herein.

The materials of the present invention are, as noted hereinabove, useful in a wide variety of end use applications where wear resistance or hardness or both are needed. The materials are particularly useful in nozzles, such as sand blast nozzles and waterjet cutting nozzles, wear guides, bushings, powder compacting dies, valve parts, router bits, cutting tools, end mills, indexable inserts, wire drawing die parts and the like.

What is claimed is:

1. A material having a high degree of hardness or wear resistance and comprising at least one product of an incomplete reaction between AX, A, and, optionally, an amount of X, said incomplete reaction product comprising an amount of unreacted AX and at least one compound AX', each compound AX' having a stoichiometry which differs from that of AX, wherein A is selected from the group consisting of titanium, manganese, zirconium, hafnium, vanadium, niobium, tantalum, iron, chromium, molybdenum and tungsten and X is selected from the group consisting of boron, carbon, silicon and nitrogen.

2. The material of claim 1 wherein X is carbon.

3. The material of claim 2 wherein A is selected from the group consisting of tungsten or hafnium.

4. The material of claim 1 further comprising a residual amount of A.

5. The material of claim 1 having a Vickers hardness of at least about 1900 kg/mm$^2$ measured using a 1 kg load, and having an abrasion wear resistance of at least about 500 cm$^{-3}$ measured by the ASTM G65 method.

6. The material of claim 1 having a density of more than about ninety percent of theoretical density.

7. The material of claim 4 having a grain size of less than about 1 micrometer.

* * * * *